US011080642B2

(12) United States Patent
Huynh et al.

(10) Patent No.: US 11,080,642 B2
(45) Date of Patent: Aug. 3, 2021

(54) INTERFACE FOR MODELING CONFIGURABLE PRODUCTS

(71) Applicant: SAP SE, Walldorf (DE)

(72) Inventors: Anh Huynh, Philadelphia, PA (US); Adriaan Venter, Durham, NC (US)

(73) Assignee: SAP SE, Walldorf (DE)

( * ) Notice: Subject to any disclaimer, the term of this patent is extended or adjusted under 35 U.S.C. 154(b) by 347 days.

(21) Appl. No.: 15/477,413

(22) Filed: Apr. 3, 2017

(65) Prior Publication Data
US 2018/0285790 A1    Oct. 4, 2018

(51) Int. Cl.
*G06Q 10/06* (2012.01)
*G06Q 30/02* (2012.01)
*G06Q 30/06* (2012.01)

(52) U.S. Cl.
CPC ....... *G06Q 10/067* (2013.01); *G06Q 30/0206* (2013.01); *G06Q 30/0283* (2013.01); *G06Q 30/0621* (2013.01)

(58) Field of Classification Search
CPC ............. G06Q 10/067; G06Q 30/0206; G06Q 30/0621
See application file for complete search history.

(56) References Cited

U.S. PATENT DOCUMENTS

| 7,093,005 | B2 * | 8/2006 | Patterson | G06F 9/5061 709/220 |
| 9,239,713 | B1 * | 1/2016 | Lakshman | H04W 4/50 |
| 9,430,207 | B1 * | 8/2016 | Bandhole | G06F 8/38 |
| 2002/0052941 | A1 * | 5/2002 | Patterson | H04L 67/34 709/223 |
| 2010/0299616 | A1 * | 11/2010 | Chen | G06Q 30/0601 715/753 |
| 2016/0012459 | A1 * | 1/2016 | Heindel | G06Q 30/0206 705/7.35 |
| 2017/0046135 | A1 * | 2/2017 | Hazarika | G06F 9/541 |
| 2017/0052767 | A1 * | 2/2017 | Bennett | G06F 8/34 |
| 2017/0286909 | A1 * | 10/2017 | Baynes | G06Q 10/067 |

OTHER PUBLICATIONS

Which Salesforce CPQ is right for you (Year: 2014).*

\* cited by examiner

*Primary Examiner* — Timothy Padot
*Assistant Examiner* — Francis Z. Santiago Merced
(74) *Attorney, Agent, or Firm* — Buckley, Maschoff & Talwalkar LLC

(57) ABSTRACT

Provided is a user interface for generating virtual models of configurable products. In an example, a method includes displaying the user interface including a workspace and a plurality of functions for generating models of configurable products, generating a virtual model of a configurable product based on input received via the user interface, the virtual model comprising attributes selected by the user input which are capable of being dynamically configured to generate a price quote for the configurable product and a relationship between the attributes, and in response to the virtual model being generated, generating syntax that corresponds to the virtual model and storing the syntax in an executable file. The example embodiments provide a user the ability to quickly and easily generate CPQ objects that can be executed using CPQ software without requiring the user to learn CPQ syntax.

19 Claims, 7 Drawing Sheets

INTERFACE FOR MODELING CONFIGURABLE PRODUCTS

BACKGROUND

For businesses, managing the sale of items (e.g., products and services) can become difficult due to various factors such as managing product pricing, identifying upsell opportunities, keeping track of deals being offered by the competition, and the like. Some businesses typically rely on a sales representative to be the point of contact between the customer and the business. However, sales situations often occur in which the sales representative does not have access to the most up-to-date pricing information about the business' products and services, leading to lost opportunities and slower quote times. Configuring a quote can also be a time consuming task, especially when critical data is not easily accessible in real time. Configure, Price, Quote (CPQ) software is used by many businesses to cope with some of these issues. CPQ software can assist a business by more accurately and reliably defining the price of goods across a large and constantly changing spectrum of variables. CPQ software aggregates variables, which in turn allows companies to configure products or services in the most optimal way (e.g., bundling, upsells, etc.), price them according to costs, competition, and local economic factors, and quote a customer a price in accordance therewith.

However, there are various drawbacks to using CPQ software. For example, from a potential user's perspective, the user must learn to write CPQ software based syntax or code in order to design and edit a CPQ object within the CPQ software. As with any software language, the CPQ syntax is not easy to use and understand. As a result, there can be a steep learning curve for the user resulting in lost opportunities for custom development and less new users in general. Furthermore, the CPQ software is not easy to access and install, and it is not straightforward to use. Accordingly, what is needed is a tool that facilitates the use of CPQ software.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
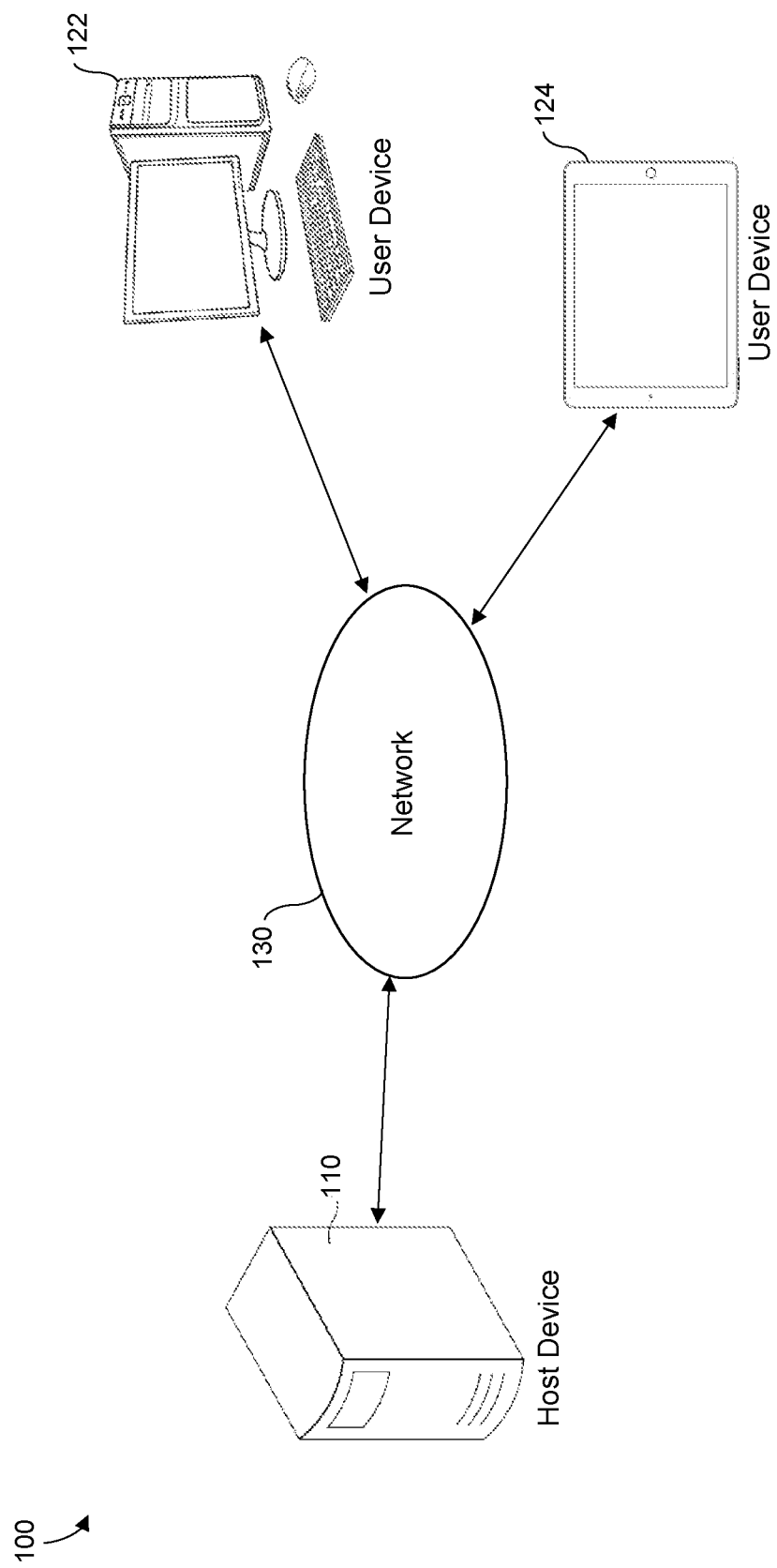
FIG. 1 is a diagram illustrating a system for generating virtual models of configurable products in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments relate to a virtual modeling tool that provides a user an environment for quickly and easily designing and building virtual models of configurable products. In these examples, a virtual model represents a product that can be added to a quote-based software such as a Configure Price Quote (CPQ) software. Once added, the virtual model can be used therein to build quotes of for products that have different or multiple types of configurations. CPQ typically includes software that is used by a salesperson or other user to generate sales quotes for products that can have different possible configurations (i.e., a configurable product). A configurable product can have one or more attributes that can be configured differently (i.e., multiple available options) making the product configurable to the desire of a potential purchaser. For example, for a product such as an automobile, a buyer might be interested in viewing price quotes based on different engine types for the automobile, different luxury packages for the automobile, different service plans for the automobile, and the like. CPQ software allows a salesperson to configure the product with different attributes and show a price quote of the product to the potential purchaser based on dynamic configurations of the attributes. The price automatically adjusts up or down based on the configurations input by the salesperson to the software.

Present CPQ software does not allow a user to generate new CPQ objects that can be used as models for generating price quotes without requiring the user to generate new CPQ syntax of the CPQ object. In other words, in order to add a new product or edit a pre-existing product, a user must learn to write and test CPQ syntax. The example embodiments provide a visual modeling tool (e.g., application, service, program, system, etc.) that enables a user to generate a virtual model or virtual object representing a product that can be used within CPQ software. Once the virtual model has been generated, it may be stored in an executable file and subsequently executed allowing it to be used to build price quotes for the product based on different configurations thereof. The visual modeling tool may include a user interface accessible to the user via a network such as the Internet. To generate a new virtual model or edit a pre-existing virtual model, the user may simply access the user interface (e.g., via a web browser, local file, etc.) and manipulate graphical user interfaces (GUIs) which may include boxes, lists, drop-down menus, tabs, etc., without requiring the user to generate and test code related to the virtual model.

According to various aspects, the user may add or edit classes, characteristics, materials, bill of materials (BOMs), and the like, to a virtual model via the user interface, while the virtual modeling tool automatically generates syntax corresponding to the virtual model in a background. As a result, a user does not need to learn how to generate CPQ syntax (or even be aware that it exists), but instead, merely manipulates visual elements within the user interface to generate and edit virtual models of configurable products. When the user is finished generating the virtual model of the product, the visual modeling tool may automatically generate and store the CPQ syntax of the designed virtual model of a product for use within the CPQ software. Accordingly, the user can generate price quotes for different configurations of the product using the newly generated virtual model.

FIG. 1 illustrates a system 100 for generating virtual models of configurable products in accordance with an example embodiment. For example, the virtual models may be modeled using a web-based software (e.g., application, program, service, etc.) hosted by host device 110 and accessed by a user via user devices 122 and 124. The modeling software may be referred to herein as a virtual modeling tool. The host device 110 may be a web server, a cloud computing system, a central server, and the like. Access to the host device 110 may be via a network 130 such as a private network, a public network, the Internet, and the like. In one example, the virtual modeling software is CPQ software that is hosted by a web server and is accessed by user devices via the Internet, but the embodiments are not limited thereto. The user devices 122 and 124 may include an embedded display or may be connected to an external display, and may include devices such as a computer, a laptop, a tablet, a mobile phone, an appliance, a television, a gaming console, a Blu-ray player, and the like. The user devices 122 and 124 may access the virtual modeling software via a web address (e.g., URL) input by a user into a web browser executing thereon. In response, the web browser may access the host device 110 and the virtual modeling software hosted by the host device 110.

The host device 110 may display a user interface associated with the virtual modeling software on a display of the user devices 122, 124. The user interface may include a workspace or palette and a plurality of functions for generating models of configurable products. The functions may include various functions that are associated with CPQ modeling objects such as classes, characteristics, materials, BOMs, and the like. A user may generate a new virtual model (also referred to herein as an object) via the user interface and edit the virtual model based on the functions included within the user interface. Here, the virtual model may represent a configurable product (e.g., clothing, vehicles, electronics, services, etc.) which can be added to price quote software where it is capable of being dynamically configured by a salesperson in order to generate a price quote for the product.

According to various embodiments, the user interface of the virtual modeling software provided by the host device 110 and displayed on the user device 122 and/or 124 may enable a user to easily build a virtual model of a configurable product by interacting with various GUIs, drop-down menus, templates, lists, and the like, without requiring the user to generate or learn complicated syntax or other code. In response, the modeling software may automatically generate syntax corresponding to the virtual model in a background of the software. For example, the syntax may be automatically generated and/or updated as the virtual model is generated, when the virtual model is saved, etc. Also, the virtual modeling software may store the syntax in an executable file that can be added to CPQ based software and subsequently executed to generate price quotes. Accordingly, a novice user of CPQ software can create a virtual model of a configurable product that can be used to generate price quotes of the configurable product.

Figure 2:
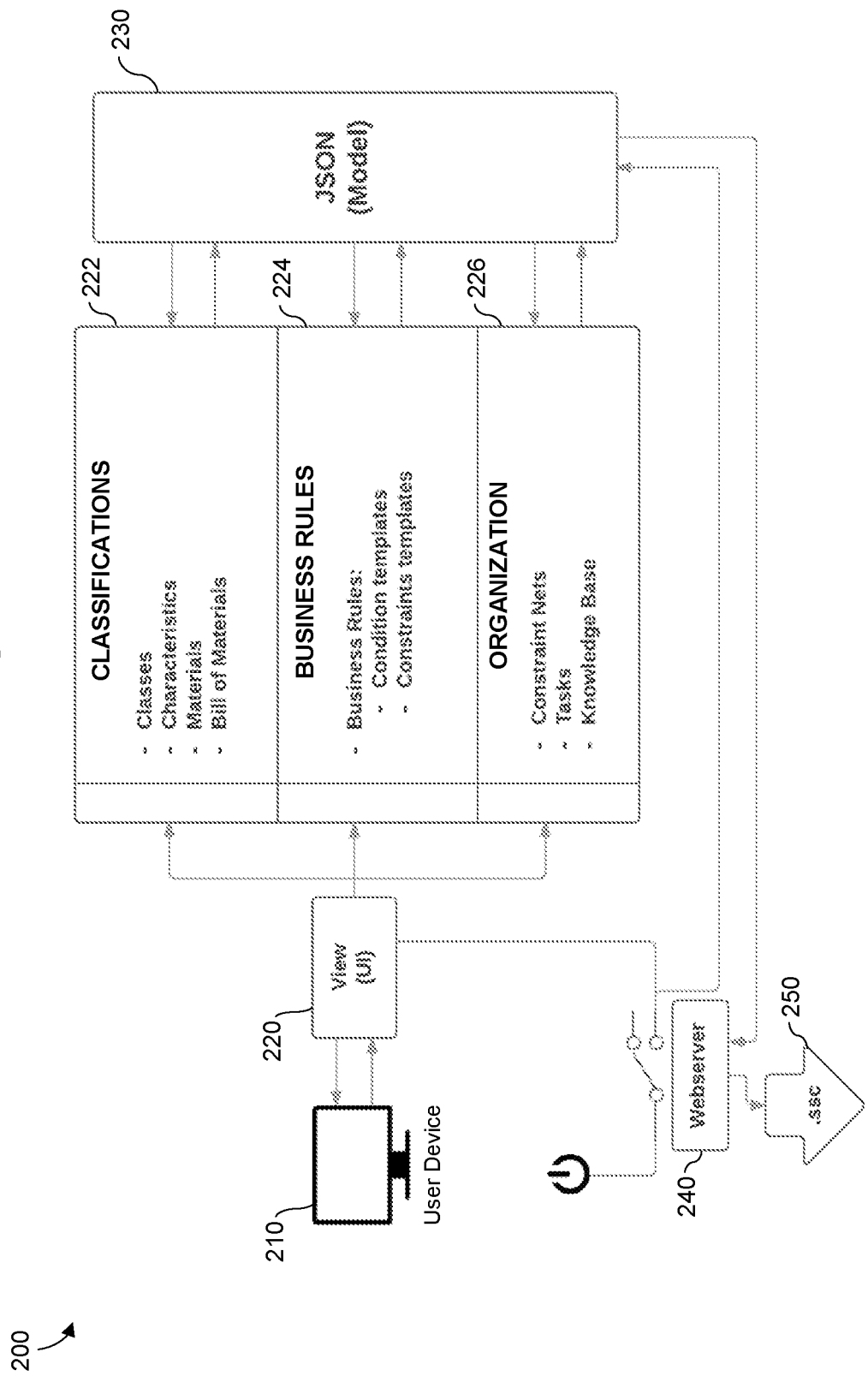
FIG. 2 is a diagram illustrating an architecture for generating virtual models in accordance with an example embodiment.

FIG. 2 illustrates an architecture 200 for generating virtual models in accordance with an example embodiment. In this example, a user of the user device 210 generates a virtual model of a configurable product via a user interface 220 of the virtual modeling tool provided by a web server 240. For example, the virtual model may include a plurality of data objects, also called model objects, that are generated, organized and grouped into data structures based on various model attributes. In the example embodiment, the model attributes are logically assigned to different categories such as classifications 222, business rules 224, and organization 226 and are managed and edited by the user via the user interface 220. For example, the user interface 220 may be a visual modeling tool that provides an intuitive UI environment where end-users and modelers alike can create CPQ models without having to write code or syntax, thus lowering the barriers to entry for potential modelers and customers. The user interface 220 may be used by anyone connected to the internet, and may require little or no knowledge of CPQ modeling syntax. The user interface may initially generate a virtual model as a JSON model 230 and subsequently translate the created JSON model 230 into a valid executable file 250, for example, an .ssc file that can be imported into a CPQ software application for further usage. For example, the executable file may be imported directly into a CPQ software and run directly therein.

The user interface 220 may be designed and controlled using an AngularJS framework as one example. The Angular JS framework may utilize a JavaScript front-end framework to construct web applications that are classified as single-page applications (SPAs) in which only sections of a web page are reloaded when a change happens as a result of a user interaction, as opposed to reloading the entire page. In this example, the SPA is a web application that may load a single HTML page and dynamically update the page as the user interacts with the application. The user interface 220 may be based on a Model-View-Controller design pattern, which means the application is modular, with most of the logic grouped into directives/templates that are used during runtime. In some examples, the user interface 220 may be divided into sub-categories such as HTML and JavaScript base, controllers, directives, cascading style sheet (CSS) components, and a JSON model. For example, a main page such as Index.html may hold the HTML framework for the entire page, and may include at least three main tabs (Classification, Business rules, Organization), one tab for each category of model attributes. Index.html may include triggers that reference to directives. Directives (such as ng-classification-collapsed.js) may be seen as markers that manipulate how their associated DOM (Document Object Model) element in the main index.html behave. They may each have their own HTML template that determines the look, along with controllers that handle logic.

A web server 240 component such as Webserver.js may be responsible for setting up the server in NodeJS. Webserver.js may allow a user to load/save/export a virtual model project by listening to post requests from the web server 240. App.js may be a module called by webserver.js and may hold the JSON structure of the main data (namely the model, business rules and conditions templates). A controller such as navbarController.js may contain functions that manipulate the virtual models, such as load, save or export a project. As another example, navbarController.js may also post requests through to webserver.js for data transfers. Also, addConditions.js may be a helper controller that adds new condition to a business rule. The directives may be markers such as ng-classification-collapsed.js that attach specific behaviors to DOM (HTML) elements. They may be called by index.html to fill specific spaces on the page. Each has its own html template as well as controllers that handle logic. CSS may provide styling of HTML components that are displayed on the webpage.

The virtual model may be created using a JSON model 230. JSON is a lightweight, highly accessible text based framework that is used to store objects in JavaScript. In this case, app.js may contain all the data structures, such as the model and its templates. For example: app.js contains an empty structure of the model inside a special AngularJS variable named $rootScope.jsonData. In the beginning, this structure of the user interface 220 may include an empty palette (i.e., background where everything is stored before being transferred to a JSON file) and an empty canvas (i.e., where unsaved changes are temporarily stored), while the data structures for each entity are created but left unpopulated. The palette, canvas, and data structures may be populated at runtime as the user manipulates the model through UI components that the tool provides. In the example of FIG. 2, the main page and AngularJS directives make up the front-end of the tools, whereas webserver.js (and app.js) are the main back-end modules. All the project data may be saved to a single JSON file 230 whenever the user saves. Each arrow indicated the flow of data. webserver.js is the starting point at run-time, and is also the ending point when the user decides to save or translate the JSON model 230 to CPQ syntax which is then exported into an executable file structure such as a .ssc file 250, for example. As described herein, the user interface 220 may be a single page applications in which the main page never refreshes. Instead, only segments of the page may refresh when called upon. It is important to note that the flow of data works in reverse direction as well, i.e. an existing executable file containing CPQ syntax such as .ssc file 250, may be loaded and visualized on the user interface 220 by translating it into a corresponding JSON model 230 and by generating the corresponding views.

AngularJS follows the Model View Controller pattern or MVC, which is a software design pattern for developing web applications. Model View Controller pattern is made up of the following three parts: a model stores data that is retrieved from the server and manipulated by the controllers, a view is generated for users to see and interact which, and a controller manipulates the data (model). Changes are recorded and reflected in both Model and View. For example, changes to an object may be carried through to all objects related to the changed object. For example if a characteristic is added to class X, and class Y inherits its characteristics from X, the characteristic added to X may automatically be added to class Y. Its modular nature makes the MVC pattern very powerful. It makes the code-base more intuitive and simpler to understand, as related components are grouped together, yet each group interact separately from other groups.

Figure 3A:
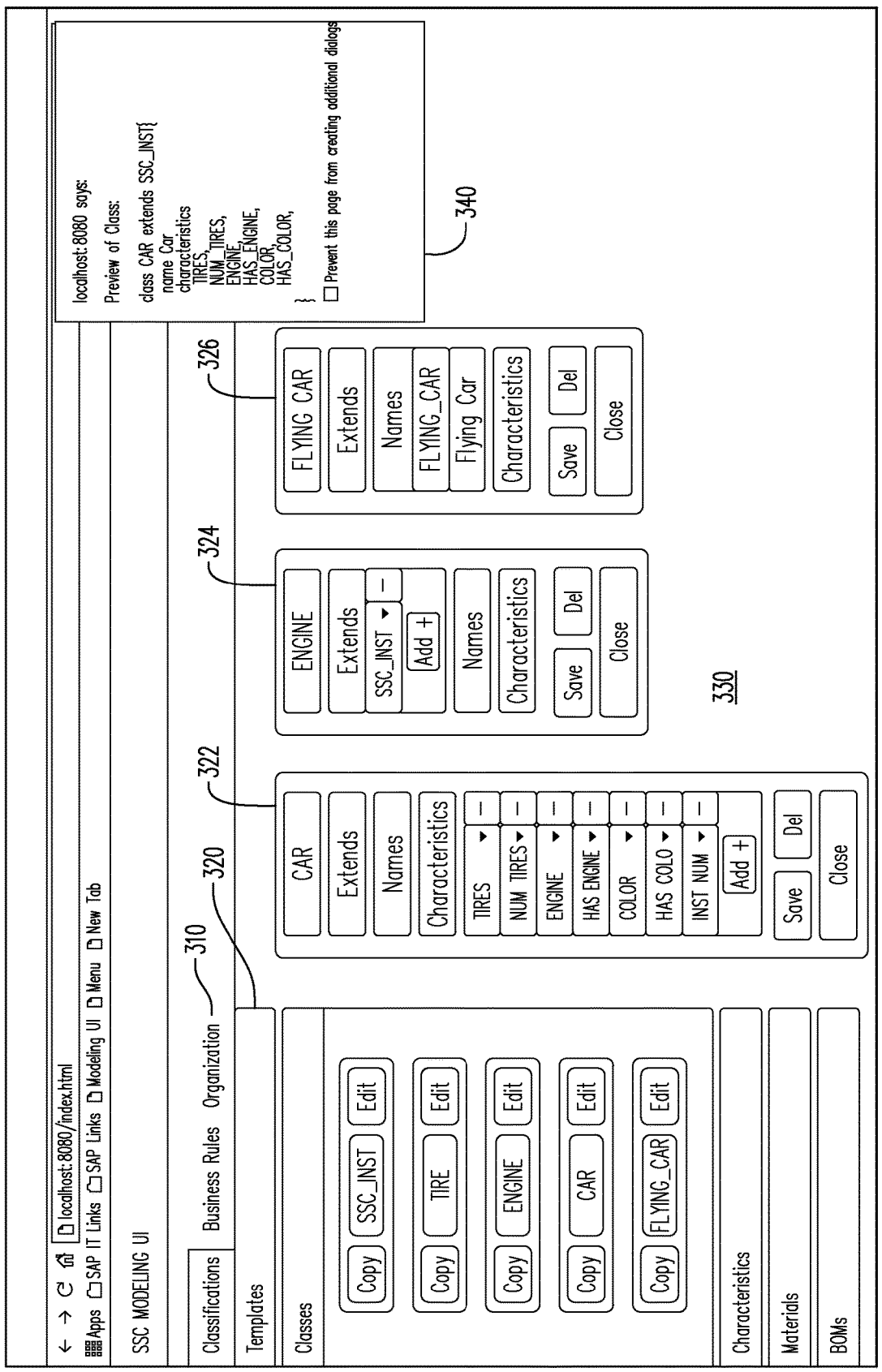
FIGS. 3A-3C are diagrams illustrating views of a user interface for generating virtual models in accordance with example embodiments.
Figure 3B:
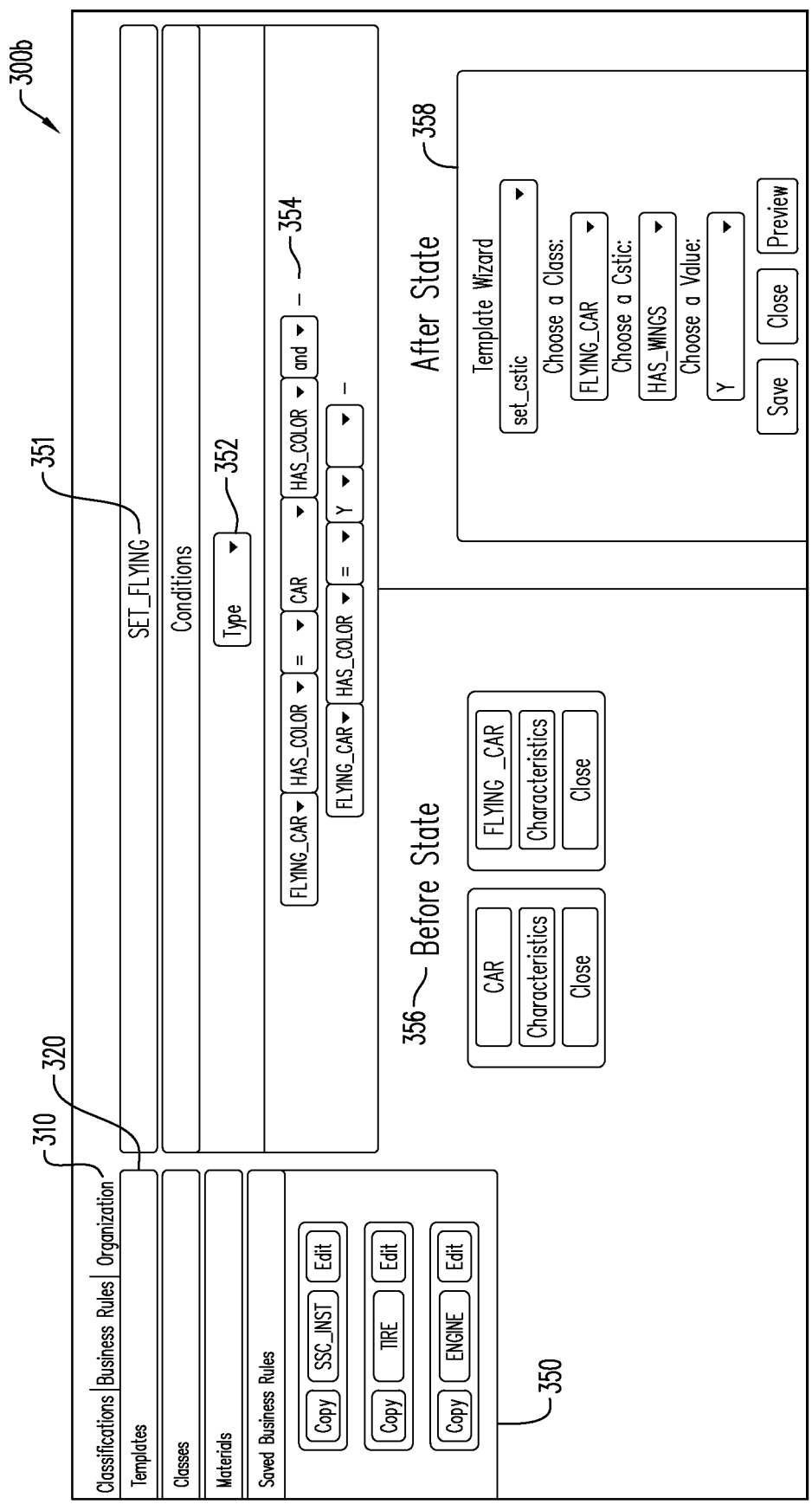
Figure 3C:
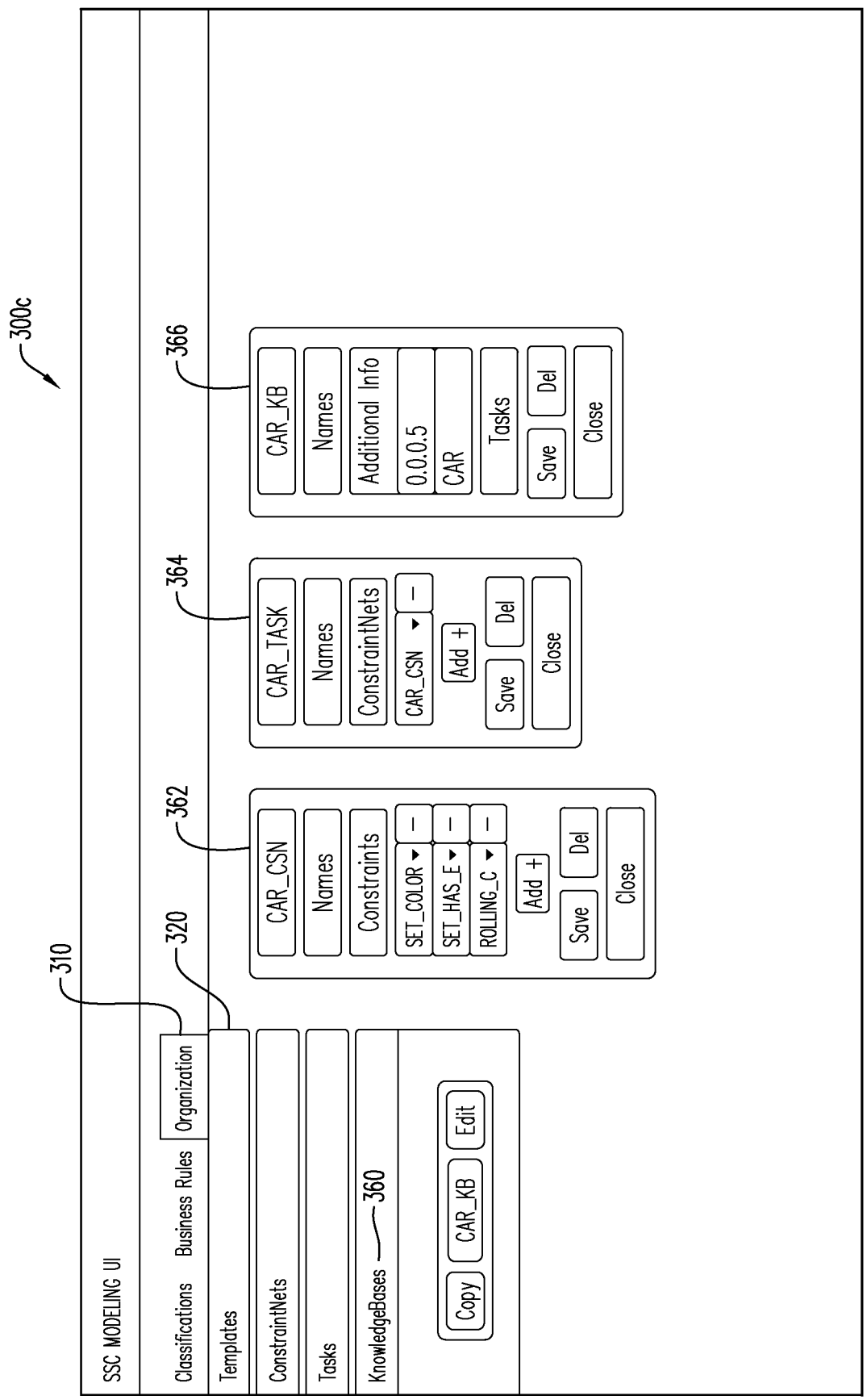

FIGS. 3A-3C illustrate views of a user interface 300 for generating virtual models in accordance with an example embodiment. For example, the user interface 300 may be used to create new virtual models and edit previously existing virtual models of configurable products. The user interface 300 includes a plurality of functions 310 which in this example includes a classifications function, a business rules function, and an organization function. The functions 310 may be used to define a new virtual model, edit a pre-existing virtual model, generate characteristics of the virtual model, and otherwise design the virtual model. Furthermore, each function 310 includes a plurality of respective menu options 320. Each menu option may correspond to an attribute of the function. The user interface 300 further includes a workspace 330 adjacent to the plurality of functions 310 and menu options 320. The workspace 330 may be used as an area for receiving input (model objects, model attributes) for designing and editing virtual models. By selecting the functionality tabs 310 shown in the left-hand panel of the user interface 300, the user may move through various screens of the user interface such as screens 300a, 300b, and 300c shown in FIGS. 3A, 3B, and 3C, respectively.

In this example, the functionality tabs 310 include a classifications tab which is used to create and define base model objects, a business rules tab which is used to enforce logic threads on existing model objects, and an organizations tab which is used to organize existing model objects by grouping base model objects. However, other tabs may be included and the embodiments are not limited thereto. Different types of configurable products (i.e., virtual model objects or entities) can be newly created via the functionality tabs 310. Each object can be edited, for example, name, description, additional information, and the like. If an object is edited in one window, all of its references elsewhere may also be changed based on the edited form. For example, by changing the name of a characteristic (Cstic), references of that characteristic in classes (under "Characteristics") will also change the name on a global basis. Virtual model objects can be accessed by clicking an Edit tab or another button or command. In response, the object and its attributes may then appear in the workspace 330 and be ready to be edited. Information may be input by a user through text fields and accordions (dropdowns) of the user interface 300. Dropdowns or drop-down menus may be populated by relevant lists which may be predetermined.

In the example of FIG. 3A, a view of a classifications screen 300a corresponding to a classifications function being selected is shown and has menu options including templates, classes, characteristics, materials, and BOMs. Each of the menu options correspond to attributes of the classifications function which can be added to a virtual model of a configurable product. Here, under the Classes attribute, three additional attributes appear that are related to the Classes attribute and include Car 322, Engine 324, and Flying Car 326. In the attribute "FLYING_CAR", for instance, the Extends dropdown is populated by the list of classes as it shows inheritance. All inherited characteristics may be added as read only characteristics to the attribute of FLYING_CARs. In this example, Names presents text boxes while Characteristics is populated by the list of characteristics. As an example, a user can choose other classes that FLYING_CAR should inherit from. In addition, the user can assign or edit the name and description of the FLYING_CAR attribute and its various characteristics. As another example, the user can add existing characteristics to the FLYING_CAR attribute.

Once an object model has been designed via the workspace 330, the user may select a preview function by a particular user command or by a preset button. In response, the user interface 300 may display a preview window 340 that displays a preview of syntax corresponding to the edited attributes included in the workspace 330. Accordingly, a user can view the syntax should they so desire. However, they do not need to generate the syntax because the syntax is automatically generated by the software via the selections made by the user via the user interface 300.

The user interface 300 may include both a canvas and a palette which are broadly referred to herein as workspace 330. The canvas may be where unsaved changes are stored. Once a user saves a virtual model it is then saved to the palette. Once a component is closed and taken off the workspace 330, it may also be removed from the canvas. The palette may also be referred to as the backbone where everything is then saved as a JSON file once the user decides to save the project. Whenever an object is selected to be edited its information is transferred from the palette to the canvas. When it is saved after being edited the palette is overwritten with the new object data from the canvas.

As shown in FIG. 3B, a view of a business rules function screen 300b corresponding to a business rules tab being selected is shown and enables business rules to be created easily through templates without sacrificing flexibility. Constraints may be created and added to a virtual model and its attributes. In this example, a user may choose from predetermined templates of the business rules. The business rules function tab provides a different set of menu options 320 than the classifications function tab. Under the business rules function, ready-made templates may be used as constraints for constraint syntax. A constraint may be features or attributes of a product. In the example of a car, if a user chooses to generate a quote for a Ford F150 truck (base object) and selects a constraint of a "deluxe version" the software fills in predefined syntax for the deluxe version that defines the attributes associated therewith such as leather interior, chrome wheels, navigation, etc.

In the example of FIG. 3B, a constraint is being applied to an attribute of the virtual model. Here, the list of constraints 350 (classes, materials, and other attributes) are provided under the business rules menu option. In this example, a set flying condition is selected. A name and description of the constraint is shown in 351 and a dropdown to choose a condition type of conditions to add to the constraint is shown in 352, and 354 shows a predetermined list of conditions that can be added. In the "Before State" in 356, elements in the pattern ("objects" section in the syntax) of the business rules are displayed. Meanwhile, in 358 a template wizard for business rules manipulation is shown. Based on the combination of inputs the, business rule syntax may be constructed using the template wizard 358.

In the example of FIG. 3C, a view of an organizations screen 300c corresponding to an organizations function being selected is shown, and has different menu option 320 than the other functions. In this example, a list of elements 360 that are capable of being selected are shown under the menu option Knowledge Bases. Here, Constraint Net "CAR_CSN" 362 includes a list of constraints, a task "CAR TASK" 364 includes a list of Constraint Nets, and a Knowledge Base "CAR_KB" 366 with Additional Info is shown.

In the examples of FIGS. 3A-3C, the menus (tabs) structure is relatively simple. The menu items that have to do with file manipulation i.e. Save, Load, Export are under the [MENU] dropdown in the top right corner. The remainder of the webpage may be used for working on the project. However, the embodiments are not limited to the user interface 300 shown in FIGS. 3A-3C and may be designed in any way or fashion.

Figure 4:
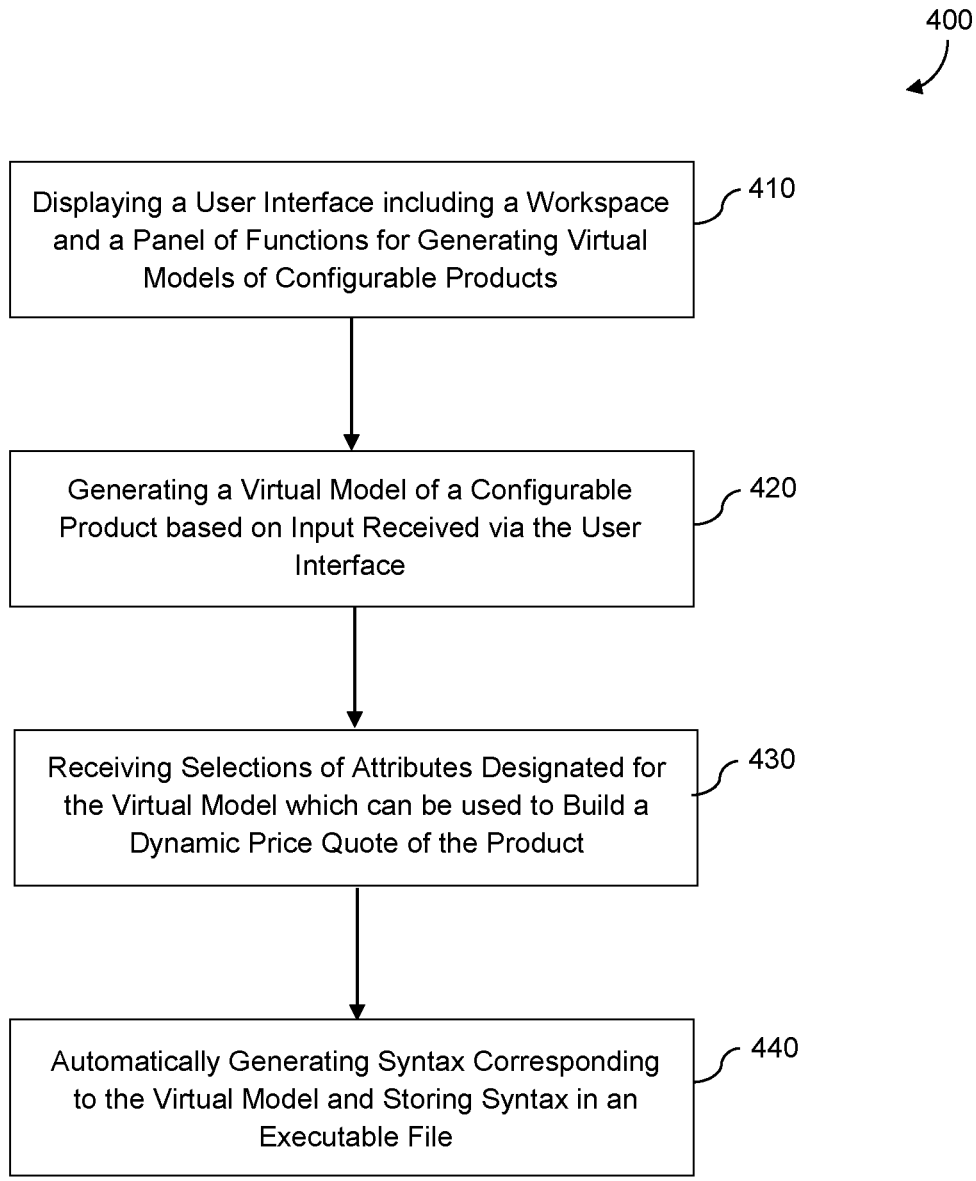
FIG. 4 is a diagram illustrating a method for generating a virtual model of a configurable product in accordance with an example embodiment.

FIG. 4 illustrates a method for generating a virtual model of a configurable product in accordance with an example embodiment. For example, the method 400 may be performed by virtual modeling software accessed via a web-based system, but the embodiments are not limited thereto. Referring to FIG. 4, in 410, the method includes displaying a user interface including a workspace and a plurality of functions for generating models of configurable products. The plurality of functions may be displayed in a panel that is adjacent to the workspace which may be a palette or window.

The functions may include one or more of a classification function which creates and defines a virtual model, a business rules function which enforces logical threads on the virtual model, an organization function which organizes the virtual model, and the like. The classification function may be used to define characteristics of a virtual model such as materials, options, structural components, and the like, of a configurable product. In some embodiments, the classification function may include predefined templates for creating at least one of a new class for the virtual model, a new characteristic for the virtual model, a new material for the virtual model, and the like. The predefined templates may be predefined by the developer of the software who is familiar with CPQ syntax. As another example, the plurality of functions may include a preview function that when selected by the user input displays a preview of the generated syntax corresponding to the virtual model of the configurable product.

According to various aspects, the GUIs that are displayed by the predefined templates included within the Business Rules may be dependent on the templates themselves. The example embodiments provide a new syntax structure to allow developers to specify what inputs are needed (e.g., Characteristics, Classes, Materials, etc.) and how many are needed. That is, the example embodiments provide a new language for these templates. A GUI may automatically adjust to the needs of the predefined templates. In this case, user input can then be directly injected into the CPQ syntax upon export. The application described herein can take in any conforming template and produce a GUI for that template, and then inject the variables back into the CPQ syntax provided in the template. For example, theoretically the developer could ask for a large number of inputs (e.g., 300 or more) and the GUI would allow for that.

In 420, the method includes generating a virtual model of a configurable product based on input received via the user interface, and in 430 the method includes receiving selections of attributes to be included in the virtual model and which are capable of being dynamically configured to generate a price quote for the configurable product. The virtual model may also include a relationship between the attributes that is predefined or that is selected by the user input. The relationship may link certain attributes together based on configurations of the attributes. For example, a particular class of a configurable product may have different possible materials that are capable of being chosen than another class of the configurable product. This relationship may be designated within the virtual model. In response to the virtual model being generated, in 440, the method further includes automatically generating syntax that corresponds to the virtual model and storing the syntax in an executable file. The syntax may be generated periodically, when the model is saved, or the like. For example, the virtual model of the configurable product may be a CPQ modeled object of the configurable product, and the generated syntax may include CPQ syntax that is capable of being executed by CPQ software Each attribute of the virtual model may be configurable. That is, each attribute may have a plurality of options that can each be selected and used to configure the attribute for a price quote. For example, the plurality of options of the attribute may be selected from a predetermined list of possible options that are capable of being added to the configurable attribute. Here, the plurality of options may be selected from the predetermined list via at least one of a drag-and-drop operation and a drop-down menu selection operation.

Figure 5:
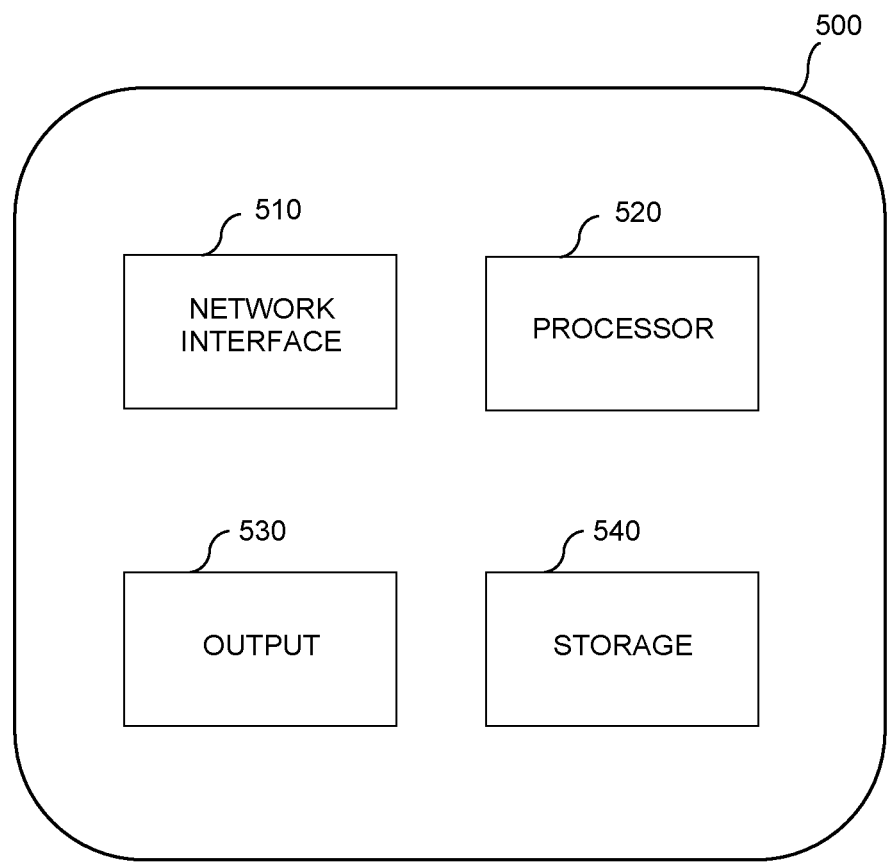
FIG. 5 is a diagram illustrating a device for generating a virtual model of a configurable product in accordance with an example embodiment.

FIG. 5 illustrates a device 500 for generating a virtual model of a configurable product in accordance with an example embodiment. For example, the device 500 may be a host device such as a web server, a cloud computing system, or another device. Also, the device 500 may perform the method of FIG. 4. Referring to FIG. 5, the device 500 includes a network interface 510, a processor 520, an output 530, and a storage device 540. Although not shown in FIG. 5, the device 500 may include other components such as a display, an input unit, a receiver, a transmitter, and the like. The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the device 500, an externally connected display, a cloud, another device, and the like. The storage device 540 is not limited to any particular storage device and may include any known memory device such as RAM, ROM, hard disk, and the like.

The network interface 510 may transmit and receive data associated with the virtual modeling application to a device such as a user device. The output 530 may display a user interface including a workspace and a plurality of functions for generating models of configurable products. The workspace may include a window for generating and editing virtual models of configurable products and a panel adjacent to the window displaying the plurality of functions. The plurality of functions may include functions for developing, editing, and defining objects of configurable products. In some embodiments, the functions may include a preview function that when selected by the user input causes the processor 520 to control the output 530 to display a preview of the generated syntax corresponding to the virtual model of the configurable product.

According to various embodiments, the processor 520 may generate a virtual model of a configurable product based on input received via the user interface. For example, the virtual model may include attributes selected by the user input which are capable of being dynamically configured to generate a price quote for the configurable product. The virtual model may also include a relationship between the attributes that is predefined and/or selected by the user input. Furthermore, in response to the virtual model being generated, the processor 520 may generate syntax that corresponds to the virtual model and store the syntax in an executable file stored in the storage device 540. For example, the virtual model of the configurable product generated by the processor 520 may include a CPQ model of the configurable product, and the generated syntax may include CPQ syntax that is capable of being executed by CPQ software.

Each attribute may include a plurality of options that can be used to configure the attribute for a price quote, and the plurality of options may be designated by the user input via the user interface. The plurality of options of the attribute may be selected from a predetermined list of possible options displayed by the output 530 and which are capable of being added to the configurable attribute. The plurality of options of the attribute may be selected from the predetermined list of possible options via at least one of a drag-and-drop operation and a drop-down menu selection operation that is detected by the processor 520.

The example embodiments provide a CPQ modeling tool that enables a user to generate CPQ software syntax through graphical components such as text-boxes, dropdowns, accordions, and more. Instead of a user having to type out tedious CPQ software syntax, the user can achieve the same result by simply interacting with an intuitive graphical user interface provided herein. Furthermore, the CPQ modeling tool may be a web-application allowing it to be run on just about any type of web browser on any platform.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing device comprising:
   an output configured to display a user interface of a virtual modeling software comprising a workspace and a plurality of functions for generating models of configurable objects; and
   a processor configured to
      detect manipulation of graphical user interface (GUI) elements via the user interface,
      generate a virtual model in JavaScript Object Notation (JSON) format comprising configurable characteristics that each provide a plurality of selectable options for differently configuring a configurable object and constraints to be logically enforced on the configurable characteristics, based on the detected manipulation received via the user interface,
      convert, via the virtual modeling software, the virtual model in the JSON format into an executable file that comprises Configure Price Quote (CPQ) syntax that executes the virtual model, and
      import the executable file comprising the CPQ syntax directly into a CPQ software application capable of executing the CPQ syntax within the executable file,
   wherein, when executed, the CPQ software application generates a quoted value for a built configuration of the configurable object based on a combination of dynamic selections of selectable options from the imported CPQ syntax of the executable file.

2. The computing device of claim 1, wherein the plurality of functions comprise at least one of a classification function which creates and defines a virtual model, a rules function which enforces logical threads on the virtual model, and an organization function which organizes the virtual model.

3. The computing device of claim 2, wherein the plurality of functions comprise the classification function, and the classification function comprises predefined templates for creating at least one of a new class for the virtual model, a new characteristic for the virtual model, a new material for the virtual model.

4. The computing device of claim 1, wherein a configurable characteristic comprises an input field that can receive a value of a plurality of options that can be used to differently configure the configurable object, and the plurality of options are designated by a user input via the user interface.

5. The computing device of claim 4, wherein the plurality of options comprise a subset of options selected from a predetermined list of options displayed by the output and which are capable of being added to the configurable object.

6. The computing device of claim 5, wherein the plurality of options are selected from the predetermined list via at least one of a drag-and-drop operation and a drop-down menu selection operation that is detected by the processor.

7. The computing device of claim 1, wherein the plurality of functions displayed by the output comprise a preview function that causes the processor to control the output to display a preview of the CPQ syntax corresponding to the virtual model of the configurable object.

8. The computing device of claim 1, wherein the workspace displayed by the output comprises a window for generating and editing virtual models of configurable objects and a panel adjacent to the window displaying the plurality of functions.

9. The computing device of claim 1, wherein, when executed, the executable file of the virtual model further adjusts the quoted value for the configurable object based on changes to the dynamic selections of selectable options for the configurable characteristics via input fields.

10. A method comprising:
    displaying a user interface of a virtual modeling software comprising a workspace and a plurality of functions for generating models of configurable objects;
    detecting manipulation of graphical user interface (GUI) elements via the user interface and generating a virtual model in JavaScript Object Notation (JSON) format comprising configurable characteristics that each provide a plurality of selectable options for differently configuring a configurable object and constraints to be logically enforced on the configurable characteristics, based on the detected manipulation received via the user interface;
    converting, by the virtual modeling software, the virtual model in JSON format into an executable file that comprises Configure Price Quote (CPQ) syntax that executes the virtual model; and
    importing the executable file comprising the CPQ syntax directly into a CPQ software application capable of executing the CPQ syntax within the executable file,
    wherein, when executed, the CPQ software application generates a quoted value for a built configuration of the configurable object based on a combination of dynamic selections of selectable options from the imported CPQ syntax of the executable file.

11. The method of claim 10, wherein the plurality of functions comprise at least one of a classification function which creates and defines a virtual model, a rules function which enforces logical threads on the virtual model, and an organization function which organizes the virtual model.

12. The method of claim 11, wherein the plurality of functions comprise the classification function, and the classification function comprises predefined templates for creating at least one of a new class for the virtual model, a new characteristic for the virtual model, a new material for the virtual model.

13. The method of claim 10, wherein a configurable characteristic comprises an input field that can receive a value of a plurality of options that can be used to differently configure the configurable object, and the plurality of options are designated by a user input via the user interface.

14. The method of claim 13, wherein the plurality of options comprise a subset of options selected from a predetermined list of options that are capable of being added to the configurable object.

15. The method of claim 14, wherein the plurality of options are selected from the predetermined list via at least one of a drag-and-drop operation and a drop-down menu selection operation.

16. The method of claim 10, wherein the plurality of functions comprise a preview function that when selected by a user input displays a preview of the CPQ syntax corresponding to the virtual model of the configurable object.

17. The method of claim 10, wherein the workspace comprises a window for generating and editing virtual models of configurable objects and a panel adjacent to the window displaying the plurality of functions.

18. A non-transitory computer readable medium having stored therein instructions that when executed cause a computer to perform a method comprising:

displaying a user interface of a virtual modeling software comprising a workspace and a plurality of functions for generating models of configurable objects;

detecting manipulation of graphical user interface (GUI) elements via the user interface and generating a virtual model in JavaScript Object Notation (JSON) format comprising configurable characteristics that each provide a plurality of selectable options for differently configuring a configurable object and constraints to be logically enforced on the configurable characteristics, based on the detected manipulation received via the user interface;

converting, by the virtual modeling software, the virtual model in JSON format into an executable file that comprises Configure Price Quote (CPQ) syntax that executes the virtual model; and import the executable file comprising the CPQ syntax directly into a CPQ software application capable of executing the CPQ syntax within the executable file, wherein, when executed, the CPQ software application generates a quoted value for a built configuration of the configurable object based on a combination of dynamic selections of selectable options from the imported CPQ syntax of the executable file.

19. The non-transitory computer-readable medium of claim 18, wherein a configurable characteristic comprises an input field that can receive a value of a plurality of options that can be used to differently configure the configurable object, and the plurality of options are designated by a user input via the user interface.

* * * * *